(12) United States Patent
Zhang et al.

(10) Patent No.: US 8,225,836 B2
(45) Date of Patent: Jul. 24, 2012

(54) DEVICE AND METHOD FOR FORMING TIRES

(76) Inventors: Zhiquan Zhang, Tianjin (CN); Jianhao Zhang, Tianjin (CN)

(*) Notice: Subject to any disclaimer, the term of this patent is extended or adjusted under 35 U.S.C. 154(b) by 754 days.

(21) Appl. No.: 12/267,643

(22) Filed: Nov. 10, 2008

(65) Prior Publication Data

US 2009/0218036 A1 Sep. 3, 2009

(30) Foreign Application Priority Data

Mar. 3, 2008 (CN) .......................... 2008 1 0052356

(51) Int. Cl.
*B29D 30/20* (2006.01)
(52) U.S. Cl. ........ 156/396; 156/111; 156/117; 156/397; 156/406.2
(58) Field of Classification Search .................. 156/111, 156/117, 130, 396, 397, 406.2
See application file for complete search history.

(56) References Cited

U.S. PATENT DOCUMENTS

| | | | | |
|---|---|---|---|---|
| 5,215,611 A | * | 6/1993 | Sergel et al. | 156/111 |
| 6,979,378 B2 | * | 12/2005 | Okada et al. | 156/111 |
| 7,118,642 B2 | * | 10/2006 | Bakos et al. | 156/111 |

* cited by examiner

*Primary Examiner* — Katarzyna Wyrozebski Lee
*Assistant Examiner* — Scott W Dodds
(74) *Attorney, Agent, or Firm* — Matthias Scholl P.C.; Matthias Scholl

(57) ABSTRACT

Provided is a device for forming a special giant all-steel radial OTR tire in a continuous process, the device comprising a first base guide rail, a second base guide rail, a headstock, a main building drum, a belt housing, a belt drum and an overhead rail. The first base guide rail and the second base guide rail are parallel to each other. The overhead rail comprising a first traveling unit and a second traveling unit are disposed above the first base guide rail and the second base guide rail. A method for forming a special giant all-steel radial OTR tire in a continuous process is also provided.

2 Claims, 2 Drawing Sheets

DEVICE AND METHOD FOR FORMING TIRES

CROSS-REFERENCE TO RELATED APPLICATIONS

This application claims priority to Chinese Patent Application No. 200810052356.4 filed on Mar. 3, 2008, the contents of which are incorporated herein by reference.

BACKGROUND OF THE INVENTION

1. Field of the Invention

The invention relates to a device and method for forming radial tires in a single continuous process, and particularly to a device and method for forming special giant all-steel radial off the road (OTR) tires in a single continuous process.

2. Description of the Related Art

Currently, special giant all-steel radial OTR tires feature excessive and heavy internal components, complex forming technology, large-size, and relatively high weight carcasses. Therefore, traditional one-step forming methods and devices for forming special giant all-steel radial OTR tires are no longer useful.

SUMMARY OF THE INVENTION

In view of the above-described problems, it is an objective of the invention to provide a device for forming a special giant all-steel radial OTR tire in one continuous process that meets green tire forming technology requirements, solves the problem of safely unloading tires, and features high efficiency.

It is another objective of the invention to provide a method for forming a special giant all-steel radial OTR tire in one continuous process that meets green tire forming technology requirements, solves the problem of safely unloading tires, and features high efficiency.

To achieve the above objectives, in accordance with one embodiment of the invention, provided is a method for forming a special giant all-steel radial OTR tire in one continuous process, the method being applied to a device comprising a pair of base guide rails, a headstock, a main building drum, a belt housing, a belt drum and an overhead rail, the method comprising the steps of:

a) applying and stitching body ply package with the help of body ply servicer after the main building drum moves to a preset position along with the headstock;

b) applying and stitching belt package on the movable belt drum with the help of a belt servicer;

c) locating and loading beads with the help of a tailstock assembly after the main building drum moves to a position of a bead presetter along with the headstock;

d) transferring a belt transfer ring containing the belt package to a preset waiting position by a first traveling unit;

e) shaping, applying and stitching the belt package again with the help of the tailstock assembly after the main building drum continues moving to another preset position;

f) performing inflation, turn-up of a tire sidewall and rolling after the main building drum continues moving to yet another preset position;

g) applying and stitching a tread by a strip winding system after the position of the main building drum is changed; and h) unloading the tire after the main building drum moves to a position of a tire unloading ring.

In a class of this embodiment or in another embodiment, the step (a) comprises (i) installing fixedly the carcasses components servicers on both sides of the base guide rail, (ii) transferring carcasses to the main building drum by a corresponding servicer in a preset order, (iii) moving the main building drum to a center position of an output end of a servicer corresponding to the carcass in a preset order, and (iv) applying and stitching the body ply package with the help of a movable support.

In a class of this embodiment or in another embodiment, the step (c) comprises (i) providing a pair of bead clamping rings at the side of the base guide rail, (ii) providing a movable tailstock assembly on the other end of the base guide rail, (iii) loading the beads by the bead clamping rings, (iv) descending by a movable support supporting a main shaft of the main building drum, (v) cooperating with the main shaft of the main building drum via the movable tailstock assembly to rotate the main building drum, (vi) returning to an original position by the movable tailstock assembly, and ascending by the movable support.

In a class of this embodiment or in another embodiment, the step (d) comprises (i) moving along with the belt housing on another base guide rail parallel to the base guide rail to the preset waiting position the belt drum after the belt package is applied and stitched on the movable belt drum, (ii) centering said belt drum to said belt transfer ring;

(iii) clamping the belt package on the belt drum by the belt transfer ring, (iv) collapsing and returning to an original place by the belt drum, and (v) transferring the belt transfer ring containing the belt package to the preset position by the traveling unit so that the belt package is applied and stitched.

In a class of this embodiment or in another embodiment, a process of loading the beads in the step (e) is the same as that in the step (c).

In a class of this embodiment or in another embodiment, the step (h) comprises (i) moving the main building drum below the overhead rails, (ii) clamping a formed green tire on the main building drum by the tire unloading ring, (iii) returning to an original place by the main building drum, and (iv) moving along the overhead rails to a preset position and cooperating with a hydraulic lifting platform to unload the green tire by the tire unloading ring.

According to another embodiment of the invention, provided is a device for forming a special giant all-steel radial OTR tire in one continuous process, the device comprising: a first base guide rail, a second base guide rail, a headstock, a main building drum, a belt housing, a belt drum, and an overhead rail. The first base guide rail and the second base guide rail are parallel to each other. The headstock is disposed above and movably connected to an end of the first base guide rail. An output shaft of the headstock is connected to the main building drum. An innerliner servicer is disposed on one side of the first base guide rail. An output end of the innerliner servicer is connected to the main building drum. A body ply servicer is disposed in vicinity of the innerliner servicer. An output end of the carcass servicer is connected to the main building drum. A strip winding system is disposed on one side of the first base guide rail. The belt housing is disposed above and movably connected to an end of the second base guide rail. The belt drum is connected to an output shaft of the belt housing. A belt servicer is disposed on one side of the second base guide rail. An output end of the belt servicer is connected to the belt drum. The overhead rail is disposed above the first base guide rail and the second base guide rail. The overhead rail comprises a first traveling unit in the direction of the first base guide rail and a second traveling unit in the direction of the second base guide rail. A belt transfer ring is connected below the second traveling unit and a tire unloading ring is connected below the first traveling unit.

Advantages of the invention include the following.

1) The headstock, the main building drum and the tailstock assembly are all connected flexibly to the base guide rail. Due to a large length and large diameter of the drive shaft connected to the main building drum, only a reliable support of the tailstock assembly and the movable support can ensure the applying and stitching quality of the body ply package during the forming of a special giant all-steel radial OTR tire.

2) The movable belt housing and the belt drum connected thereto are disposed on the second base guide rail parallel to the first base guide rail, and by the belt servicer the applying and stitching of the belt package can be completed quickly and smoothly, the quality of the belt package can be ensured and an occupied area for the entire forming device is significantly reduced.

3) The two groups of the traveling unit are connected to the belt transfer ring and the tire unloading ring respectively so that the positioning and loading of the belt package can be completed with high quality in a short time. After a whole tire is formed, the tire unloading ring can be taken automatically and the special giant all-steel radial OTR tire is unloaded onto the hydraulic lifting platform in a turnover type firmly and safely, whereby improving the unloading speed and safety.

BRIEF DESCRIPTION OF THE DRAWINGS

Detailed description will be given below with reference to accompanying drawings, in which.

Figure 1:
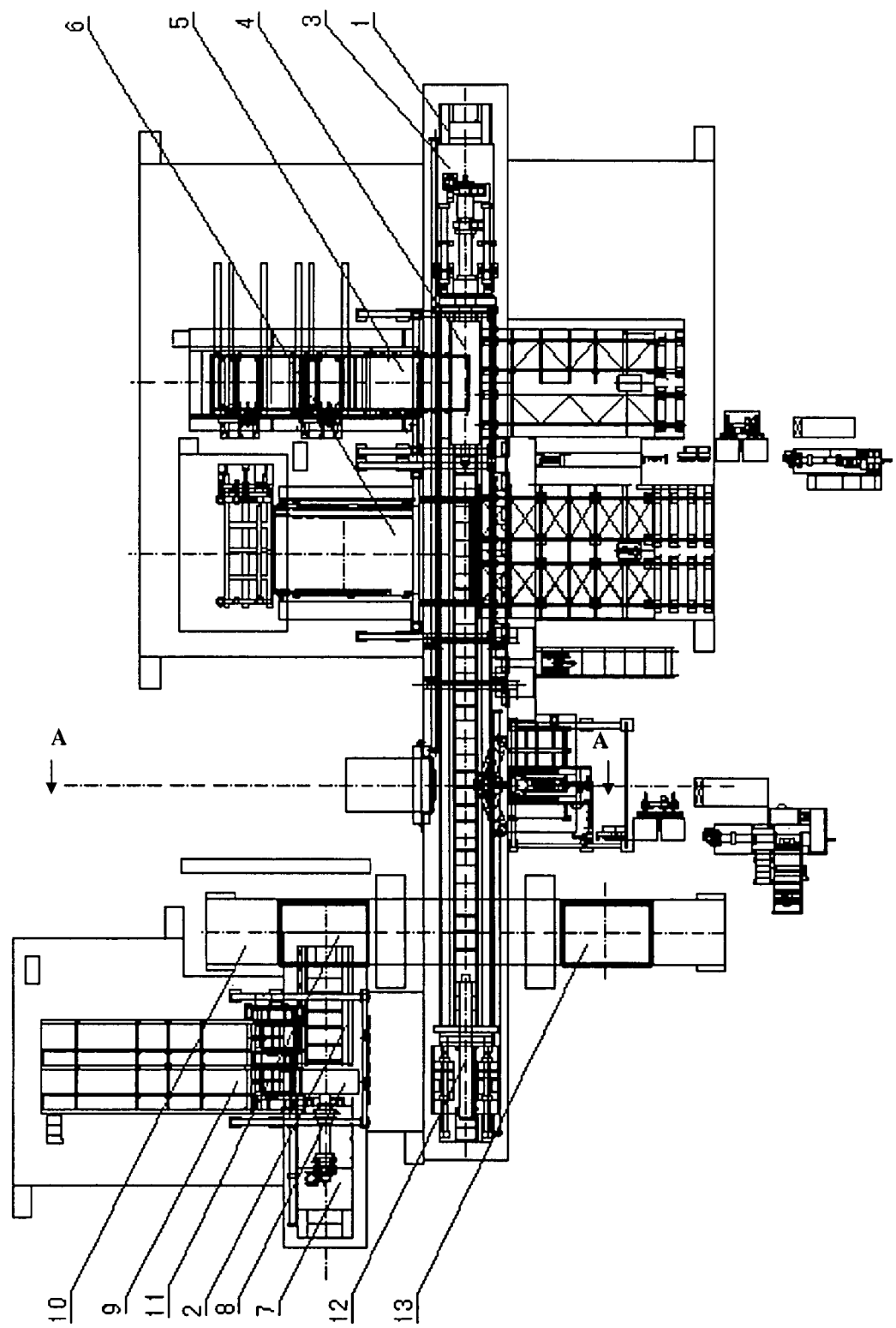
FIG. 1 is a top view of a device for forming a special giant all-steel radial OTR tire in a continuous process according to one embodiment of the invention.

Labels: 1. first base guide rail; 2. second base guide rail; 3. headstock; 4. main building drum; 5. innerliner servicer; 6. body ply servicer; 7. belt housing; 8. belt drum; 9. belt servicer; 10. overhead rail; 11. transfer ring; 12. tailstock assembly; 13. tire unloading ring; 14. traveling unit.

DETAILED DESCRIPTION OF THE EMBODIMENTS

In accordance with one embodiment of the invention, a method for forming a special giant all-steel radial OTR tire in a continuous process comprises the steps of: a) applying and stitching body ply package with the help of body ply servicer after the main building drum moves to a preset position along with the headstock; b) applying and stitching belt package on the movable belt drum with the help of a belt servicer; c) locating and loading beads with the help of a tailstock assembly after the main building drum moves to a position of beads presetter along with the headstock; d) transferring a belt transfer ring containing the belt package to a preset waiting position by a first traveling unit; e) shaping, applying and stitching the belt package again with the help of the tailstock assembly after the main building drum continues moving to another preset position; f) performing inflation, turn-up of a tire sidewall and rolling after the main building drum continues moving to still another preset position; g) applying and stitching a tread by a strip winding system after the position of the main building drum is changed; and h) unloading the tire after the main building drum moves to a position of a tire unloading ring.

The above-mentioned step (a) comprises fixedly installing the carcasses components servicers on both sides of the base guide rail, transferring carcasses to the main building drum by a corresponding servicer in a preset order, moving the main building drum to a center position of an output end of a servicer corresponding to the carcass in a preset order, and applying and stitching the body ply package by a movable support.

The above mentioned step (c) comprises providing a pair of bead clamping rings at the side of the base guide rail, providing a movable tailstock assembly on the other end of the base guide rail, loading the beads by the bead clamping rings, descending by a movable support supporting a main shaft of the main building drum, cooperating with the main shaft of the main building drum via the movable tailstock assembly to rotate the main building drum, returning to an original position by the movable tailstock assembly, and ascending by the movable support.

The above mentioned step (d) comprises moving along with the belt housing on another base guide rail parallel to the base guide rail to the preset waiting position the belt drum after the belt package is applied and stitched on the movable belt drum, centering said belt drum to said belt transfer ring, clamping the belt package on the belt drum by the belt transfer ring, collapsing and returning to an original place by the belt drum, and transferring the belt transfer ring containing the belt package to the preset position by the traveling unit so that the belt package is applied and stitched.

In the above mentioned step (e) a process of loading the beads is the same as that in the step (c).

The above mentioned step (h) comprises moving the main building drum below the overhead rails, clamping a formed green tire on the main building drum by the tire unloading ring, returning to an original place by the main building drum, and moving along the overhead rails to a preset position and cooperating with a hydraulic lifting platform to unload the green tire by the tire unloading ring.

Figure 2:
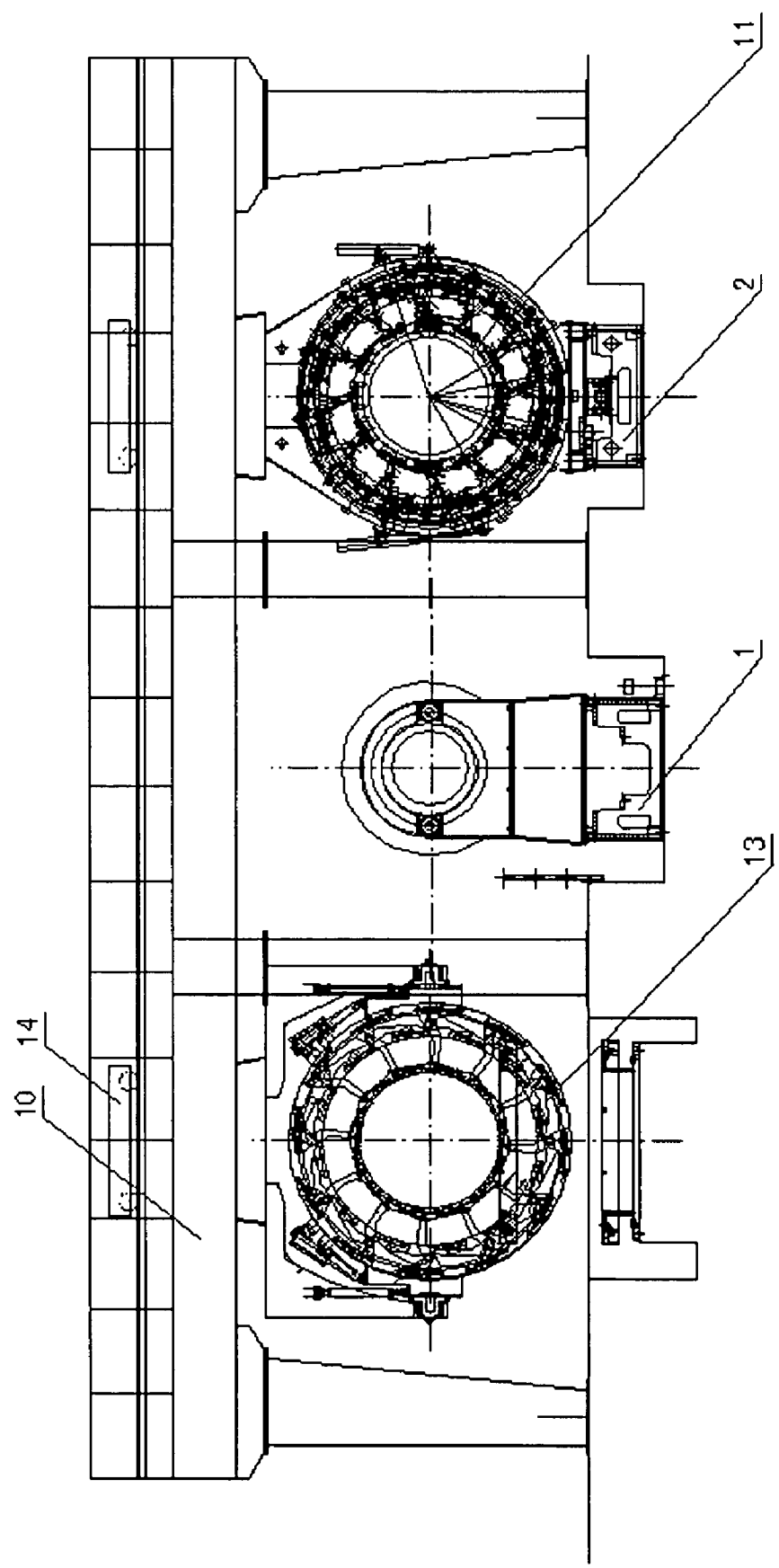
FIG. 2 is a side view in the A-A direction shown in FIG. 1.

FIGS. 1 and 2 are schematic diagrams of a device for forming a special giant all-steel radial OTR tire in a continuous process comprising a first base guide rail 1, a second base guide rail 2, a headstock 3, a main building drum 4, a belt housing 7, a belt drum 8, an overhead rail 10. The first base guide rail 1 and the second base guide rail 2 are parallel to each other. The headstock 3 is disposed above and movably connected to an end of the first base guide rail 1. An output shaft of the headstock 3 is connected to the main building drum 4. An innerliner servicer 5 is disposed on one side of the first base guide rail 1. An output end of the innerliner servicer 5 is connected to the main building drum 4. A body ply servicer 6 is disposed in vicinity of the innerliner servicer 5. An output end of the carcass servicer 6 is connected to the main building drum 4. A strip winding system is disposed on one side of the first base guide rail 1. The belt housing 7 is disposed above and movably connected to an end of the second base guide rail 2. The belt drum 8 is connected to an output shaft of the belt housing 7. A belt servicer is disposed on one side of the second base guide rail 2. An output end of the belt servicer 9 is connected to the belt drum 8. The overhead rail 10 is disposed above the first base guide rail 1 and the second base guide rail 2. The overhead rail 10 comprises a first traveling unit 14 in the direction of the first base guide rail 1 and a second traveling unit 14 in the direction of the second base guide rail 2. A belt transfer ring 11 is connected below the second traveling unit 14 and a tire unloading ring 13 is connected below the first traveling unit 14.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

The invention claimed is:

1. A device for forming a special giant all-steel radial OTR tire, the device comprising:
   a) a first guide rail (1) having a first inner side and a first outer side;
   b) a second guide rail (2) having a second inner side and a second outer side;
   c) a headstock (3);
   d) a main building drum (4);
   e) a belt housing (7);
   f) a belt drum (8);
   g) an overhead rail (10) comprising two traveling units (14);
   h) a body ply servicer (6);
   i) a belt servicer (9);
   j) a belt transfer ring (11);
   k) a tire unloading ring (13); and
   l) a tailstock assembly (12);
   wherein:
      said first guide rail (1) and said second guide rail (2) are parallel to each other;
      said headstock (3) is disposed above and movably connected to an end of said first guide rail (1);
      said tailstock assembly (12) is movably disposed on the other end of said first guide rail (1);
      an output shaft of said headstock (3) is connected to said main building drum (4);
      said main building drum is movable along said first guide rail (1) driven by said headstock (3);
      said first inner side is a side of said first guide rail (1) next to said second guide rail (2), and said first outer side is a side of said first guide rail (1) opposing said first inner side;
      said second inner side is a side of said second guide rail (2) next to said first guide rail (1), and said second outer side is a side of said second guide rail (2) opposing said second inner side;
      said body ply servicer (6) is disposed beside said first inner side for applying and stitching a body ply package on said main building drum (4);
      when moving to a position of said first guide rail (1) facing said body ply servicer (6), said main building drum (4) connects to an output end of said body ply servicer (6);
      said belt housing (7) is disposed above and movably connected to an end of said second guide rail (2);
      said belt drum (8) is connected to an output shaft of said belt housing (7);
      said belt drum (8) is movable along said second guide rail (2) driven by said belt housing (7);
      said belt servicer (9) is disposed beside said second outer side for applying and stitching a belt package on said belt drum (8);
      when moving to a position of said second guide rail (2) facing said belt servicer (9), said belt drum (8) connects to an output end of said belt servicer (9);
      said overhead rail (10) is disposed above said first guide rail (1) and said second guide rail (2), and said overhead rail (10) is perpendicular to said first guide rail (1) and said second guide rail (2);
      one of said two traveling units (14) is movably disposed at an end of said overhead rail (10) near said second guide rail (2), and the other of said two traveling units (14) is movably disposed at an end of said overhead rail (10) near said first guide rail (1);
      said belt transfer ring (11) is connected below said one of said two traveling units (14) for clamping said belt package out of said belt drum (8) and for transferring said belt package near said first guide rail (1);
      said one of said two traveling units (14) is movable between a position of said overhead rail (10) right above said second guide rail (2), and a position of said overhead rail (10) which is between said first inner side and said second inner side and which is close to said first inner side, whereby when said main building drum (4) moves to a position of said first guide rail (1) right below said overhead rail (10), said belt package is shaped, applied, and stitched onto said main building drum (4);
      said tire unloading ring (13) is connected below said the other of two traveling units (14) for moving a formed green tire away from said first guide rail (1) and said second guide rail (2) to unload the formed green tire;
      said the other of said two traveling units (14) is movable between a position of said overhead rail (10) right above said first guide rail (1) and a position of said overhead rail (10) beside said first outer side;
      when locating and loading beads on a tire body, said tailstock assembly (12) supports said outer shaft of said headstock (3), whereby said main building drum (4) maintains normal rotation; and
      when shaping, applying and stitching the belt package onto the tire body, said tailstock assembly (12) supports said outer shaft of said headstock (3), whereby said main building drum (4) maintains normal rotation.

2. A method for producing a special giant all-steel radial OTR tyre by utilizing the device of claim 1, comprising:
   a) moving said main building drum (4) to a position facing said body ply servicer (6), and applying and stitching said body ply package on said main building drum (4) by said body ply servicer (6) to form a tire body;
   b) moving said main building drum (4) to a first position between the position facing said body ply servicer (6) and the position of said first guide rail (1) right below said overhead rail (10), moving said tailstock assembly (12) to support said outer shaft of said headstock (3), and locating and loading beads on the body of the tire to form a tire body with loaded beads;
   c) moving said belt drum (8) to a position facing said belt servicer (9), and applying and stitching said belt package on said belt drum (8) by said belt servicer (9);
   d) disposing said one of said two traveling unit (14) at a positon right above said second guide rail (2);
   e) moving said belt drum (8) having said belt package to the position of said second guide rail (2) right below said overhead rail (10);
   f) clamping said belt package out of said belt drum (8) by said belt transfer ring (11);

g) moving said belt transfer ring (11) clamping said belt package by said one of said two traveling units (14) to the position of said overhead rail (10) which is between said first inner side and said second inner side and which is close to said first inner side;

h) moving said main building drum (4) having the body of the tire with loaded beads to the position of said first guide rail (1) right below said overhead rail (10);

i) moving said tailstock assembly (12) to support said outer shaft of said headstock (3);

j) shaping, applying, and stitching said belt package clamped by said belt transfer ring (11) onto the tire body with loaded beads to form a tire with loaded beads and shaped belt package;

k) moving said main building drum (4) to a second position between the position facing said body ply servicer (6) and the position of said first guide rail (1) right below said overhead rail (10), and performing inflation, turn-up of a tire sidewall and rolling to said main building drum (4) having the tire with loaded beads and shaped belt package to form a inflated and rolled tire with loaded beads and shaped belt package;

l) moving said main building drum (4) to a third position between the position facing said body ply servicer (6) and the position of said first guide rail (1) right below said overhead rail (10), and applying and stitching a tread onto the inflated and rolled body of the tire with loaded beads and with shaped belt package to generate the formed green tire; and m) moving said main building drum (4) to the position of said first guide rail (1) right below said overhead rail (10), and clamping the formed green tire out of said main building drum (4) by said tire unloading ring (13);

n) moving said tire unloading ring (13) clamping the formed green tire by said the other of said two traveling units (14) away from said first guide rail (1) and said second guide rail (2) to the position of said overhead rail (10) beside said first outer side; and o) unloading the formed green tire.

\* \* \* \* \*